(12) United States Patent
Arcella et al.

(10) Patent No.: US 8,268,464 B2
(45) Date of Patent: Sep. 18, 2012

(54) CCM COMPOSITE

(75) Inventors: Vincenzo Arcella, Milan (IT);
Alessandro Ghielmi, Milan (IT); Paola Vaccarono, Milan (IT); Luca Merlo, Montorfano (IT)

(73) Assignee: Solvay Solexis S.p.A., Milan (IT)

( * ) Notice: Subject to any disclaimer, the term of this patent is extended or adjusted under 35 U.S.C. 154(b) by 4 days.

(21) Appl. No.: 12/890,473

(22) Filed: Sep. 24, 2010

(65) Prior Publication Data

US 2011/0052798 A1 Mar. 3, 2011

Related U.S. Application Data

(62) Division of application No. 11/375,605, filed on Mar. 15, 2006, now Pat. No. 7,824,788.

(30) Foreign Application Priority Data

Mar. 17, 2005 (IT) .............................. MI2005A0446

(51) Int. Cl.
*H01M 2/00* (2006.01)

(52) U.S. Cl. .............. 429/34; 429/33; 429/38; 252/502; 252/510; 428/143

(58) Field of Classification Search .................... 429/34, 429/33, 38; 252/502, 510; 428/143
See application file for complete search history.

(56) References Cited

U.S. PATENT DOCUMENTS

| | | | |
|---|---|---|---|
| 2,242,218 A | 5/1941 | Auer | |
| 2,914,596 A | 11/1959 | Gorin et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,433,082 A * | 2/1984 | Grot | 524/544 |
| 4,940,525 A * | 7/1990 | Ezzell et al. | 204/252 |
| 5,082,472 A * | 1/1992 | Mallouk et al. | 95/49 |
| 5,173,553 A | 12/1992 | Albano et al. | |
| 5,211,984 A | 5/1993 | Wilson | |
| 5,234,777 A | 8/1993 | Wilson | |
| 5,651,929 A * | 7/1997 | Molter et al. | 264/104 |
| 6,074,692 A | 6/2000 | Hulett | |
| 6,475,249 B1 | 11/2002 | Hsu et al. | |
| 6,649,295 B2 | 11/2003 | Hamrock et al. | |
| 2002/0051902 A1 | 5/2002 | Suenaga et al. | |
| 2003/0219532 A1 | 11/2003 | Kanaoka et al. | |
| 2003/0224233 A1 * | 12/2003 | Kohler et al. | 429/30 |
| 2004/0158014 A1 | 8/2004 | Wlassics et al. | |
| 2004/0191601 A1 * | 9/2004 | Grot | 429/30 |
| 2005/0014056 A1 * | 1/2005 | Zuber et al. | 429/34 |

FOREIGN PATENT DOCUMENTS

| | | |
|---|---|---|
| EP | 0 148 482 A2 | 7/1985 |
| EP | 0 239 123 A2 | 9/1987 |
| EP | 1 004 615 A2 | 5/2000 |
| EP | 1072669 A1 | 9/2006 |
| EP | 1072669 A1 * | 9/2006 |
| JP | 2006-261124 * | 9/2006 |

* cited by examiner

*Primary Examiner* — Peter D. Mulcahy
*Assistant Examiner* — Henry Hu
(74) *Attorney, Agent, or Firm* — Arent Fox LLP

(57) ABSTRACT

CCM formed of a membrane having on one of the two surfaces a first electrocatalytic layer containing a catalyst and on the other one a second electrocatalytic layer containing a catalyst, said electrocatalytic layers and said membrane containing (per)fluorinated ionomers, said CCM having the following characteristics:

size variations, for both the orthogonal directions of the plane xy, lower than 15%, by dipping the CCM, after drying at 105° C. under vacuum for one hour in demineralized water at 100° C. for 30 minutes;

the CCM remains substantially unchanged after having been subjected to treatments of 60 cycles by dipping in water at 80° C. for 8 hours and then in water at the temperature of 25° C. for 16 hours.

15 Claims, 4 Drawing Sheets

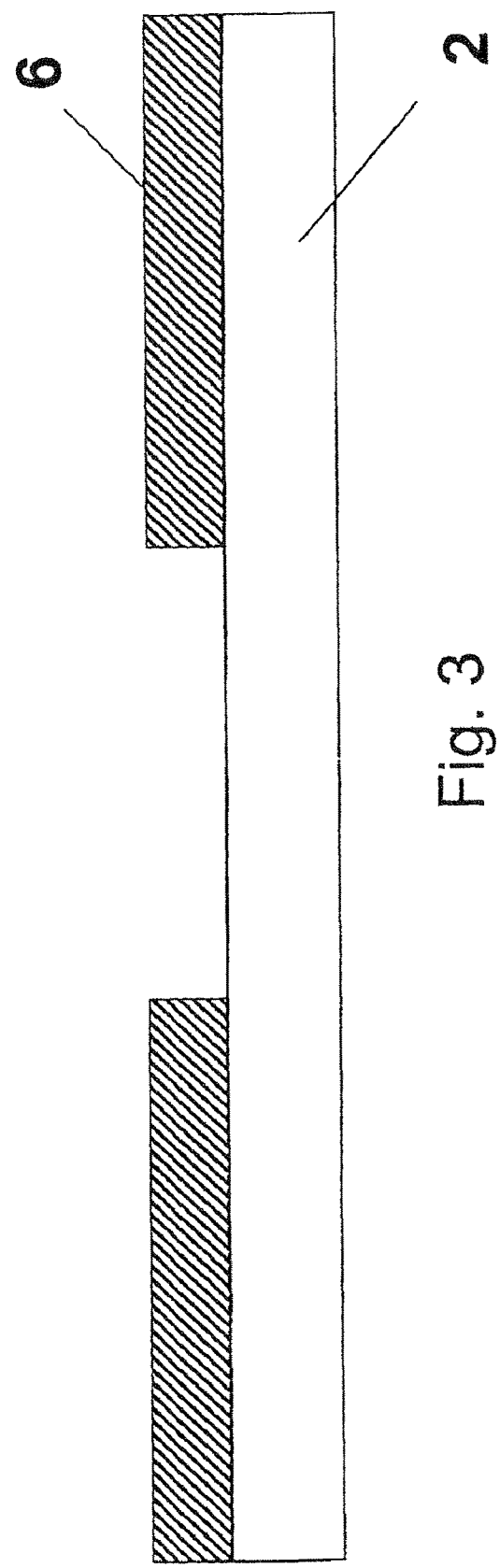

“CCM COMPOSITE

CROSS-REFERENCE TO RELATED APPLICATION

This application is a Divisional Application of U.S. patent application Ser. No. 11/375,605 filed Mar. 15, 2006, now U.S. Pat. No. 7,824,788, which claims priority to Italian Patent Application No. MI 2005 A 000446 filed Mar. 17, 2005. The disclosure of the prior applications is hereby incorporated in their entirety by reference.

FIELD OF THE INVENTION

The present invention relates to a CCM composite (Catalyst Coated Membrane), to be used in electrochemical cells, comprising a membrane having the two surfaces coated, partially or totally, with a catalytic or electrocatalytic layer containing a catalyst. The CCM electrocatalytic layers of the present invention are placed onto the membrane so that the perimeter orthogonal projection of the first electrocatalytic layer on the second one is separated from the perimeter of the latter of at least 1 mm, preferably 2 mm in each point of said projection. More specifically, the CCM of the present invention shows an improved adhesion among the layers and very limited size variations in the two orthogonal directions of the plane xy, lower than 15% and preferably lower than 10%. Further, the CCM of the present invention subjected to treatments of 60 cycles by dipping in water at 80° C. for 8 hours and then in water at a temperature of 25° C. for 16 hours, remains substantially unchanged as the electrocatalytic layers remain adherent to the membrane and no bubbles are formed at the interfaces among the membrane and the electrocatalytic layers. In addition the CCM shows good mechanical resistance in particular on the electrocatalytic layer edges. The three layers forming the CCM substantially show the same size variation in the two orthogonal directions of the plane xy as no delamination takes place among the layers. The membrane used in the composite of the present invention is a (per)fluorinated ionomers based membrane and acts as an electrolyte.

Composites formed of membranes having the surfaces coated with catalysts are known in the prior art. The composites are generally known with the name of Catalyst Coated Membrane or CCM. The two electrocatalytic layers of the CCM, usable in an electrochemical cell, form respectively the cell positive and the negative electrode.

By electrocatalytic layer it is meant a layer containing a metal and acts as electrode and as catalyst of the semireaction which takes place in the cell semielement wherein the electrode is placed.

The catalyst coated membrane can be used in polymeric electrolyte fuel cells and also in other electrochemical devices. In case of the fuel cell, when a fuel, for example hydrogen or methanol, is fed at the negative electrode (anode), the fuel is oxidized by the catalyst in the electrode, generating protons. The latter cross the negative electrode, the contact surface electrode/membrane and the membrane, reaching in the end the positive electrode (cathode). At this electrode an oxidizing agent, for example oxygen or air, is fed and in the presence of the catalyst, reacts with the protons generating water. As a result of the reaction an electric current is generated and is obtained by connecting with an electric wire the positive and the negative electrode. Therefore this reaction can be used as energy source.

The possibility of supplying electric power depends on the entity of the proton flow from the anode to the cathode, and this depends on the resistance encountered by the protons crossing the anode, the interface between the anode and the membrane, the membrane, the interface between the membrane and the cathode and lastly the latter electrode. The higher the flow, the more reduced these resistances.

In order to improve the proton flow, and thus to have high performances, it is essential to have a good contact between the electrodes and the membrane. To maintain high performances in the time, it is necessary that the contact between the electrodes and the membranes be lasting. This requires that the CCM be dimensionally stable. In particular, the size variations of the CCM after hydration must be the lowest as possible to avoid that the electrodes detach under dynamic working conditions. Dynamic working takes place, for example, when the delivered current is variable, or when turning on/turning off cycles are carried out, or when the relative humidity levels of the fuel and/or oxidizing agent are variable. In these cases the amount of water present in the cell, and therefore the CCM hydration, significantly vary in the time.

The electrodes of the fuel cells polymeric electrolyte based are generally formed of a thin film, formed of catalyst particles (Pt or Pt alloys) finely dispersed on a conductive support, usually carbon powder and containing an ionomeric binder. Besides supplying consistency to the electrode, the function of the ionomeric binder is to transport protons. At the anode, the flow takes place from the catalyst surface to the membrane one. At the cathode, the flow takes place from the membrane surface to the catalyst one.

In the preparation of the CCM the electrodes can be manufactured with different methods. For example they can be directly prepared in contact with the membrane. Alternatively they are initially placed on an inert support and then transferred on the surfaces of the ionomeric membrane. More in detail, the process for preparing the electrodes, used in the prior art, first comprises the preparation of liquid dispersions containing the catalyst, usually supported, together with the ionomeric binder. The dispersions are then deposited directly on the membrane or on the inert support, depending on the considered preparation process. When the electrode layers are directly prepared on the membrane, the latter is previously swolled with a solvent, preferably the same used for the preparation of the catalyst liquid dispersion, to avoid that it deforms when it is in contact with the dispersion. See for example U.S. Pat. No. 6,074,692 and U.S. Pat. No. 6,475,249. When the electrode layers are prepared on an inert support and then transferred onto the membrane, as it occurs in the process called "decal", the transfer is carried out in hot conditions under pressure, for example at temperatures of the order of 150° C. and at pressures of 20 bar. See for example U.S. Pat. No. 5,211,984 and U.S. Pat. No. 5,234,777. The transfer in hot conditions under pressure is a critical step of this process. It has been found by the Applicant that the transfer in hot conditions under pressure can damage the membranes, especially when thin.

Patent application US 2003/0219,532 describes a process for preparing a CCM consisting of various steps. In the first step a support is coated with a first polymeric electrolyte solution (ionomeric solution) to form a first polymeric membrane (ionomeric membrane), still containing solvent at least on its surface. In the second step a first electrode or electrocatalytic dispersion, comprising a second ionomeric solution and a catalyst, is placed on the ionomeric membrane. In the third step the first dispersion is dried to form the electrode-membrane assembly of the positive electrode, formed by the ionomeric membrane and the first electrode. The assembly forms one of the two halves of the final CCM. The three steps are repeated by using another inert support, to obtain the other CCM half, formed of the electrode-membrane assembly of the negative electrode. In the process final step the two halves are separated from the supports and are joined by interposing an ionomer solution, to favour the adhesion between the two membranes, to obtain the final CM. This step has the drawback to cause size variations in the two membranes to be coupled. Besides, each of the two CCM halves generally has a very low thickness. This causes the risk that during the assembly tearings or folds in the membrane occur. Tests carried out by the Applicant have shown that the CCM prepared with this method deteriorates quickly when it is subjected to numerous heating and cooling cycles in water. The latter are used to simulate the conditions which take place during the working of a fuel cell. It has been found that the two parts forming the CCM tend to be detached.

U.S. Pat. No. 6,649,295 describes the preparation of electrode-ionomeric membrane assembly. The ionomeric membrane is obtained by casting from a solution and annealed at a temperature preferably higher than 120° C. The catalyst dispersion is deposited on a gas diffuser and attached to the annealed membrane. The drawback of this process is that it does not guarantee a good contact between the electrode and the membrane.

The need was felt to have available a CCM having the following combination of properties:
- reduced size variations during the hydration/dehydration cycles, as it occurs for example during the cell turning on/turning off steps or when the cell has to deliver powers variable in the time, or also when the relative humidity levels of the fuel and/or the oxidizing agent are varied;
- improved adhesion of the electrocatalytic layer to the ionomeric membrane;
- substantially unchanged adhesion among the CCM layers also after numerous dipping cycles in water at high temperature and then in water at room temperature;
- improved CCM duration in electrochemical cell, in particular with improved resistance to the CCM breaks.

The Applicant has found CCM solving the above technical problem.

BRIEF DESCRIPTION OF THE DRAWINGS

FIG. 3 shows a mask placed on a support wherein the height of the mask is selected to obtain a desired ratio of the amount of a catalyst/surface unit of an electrocatalytic layer according to another embodiment of the invention.

Figure 1:
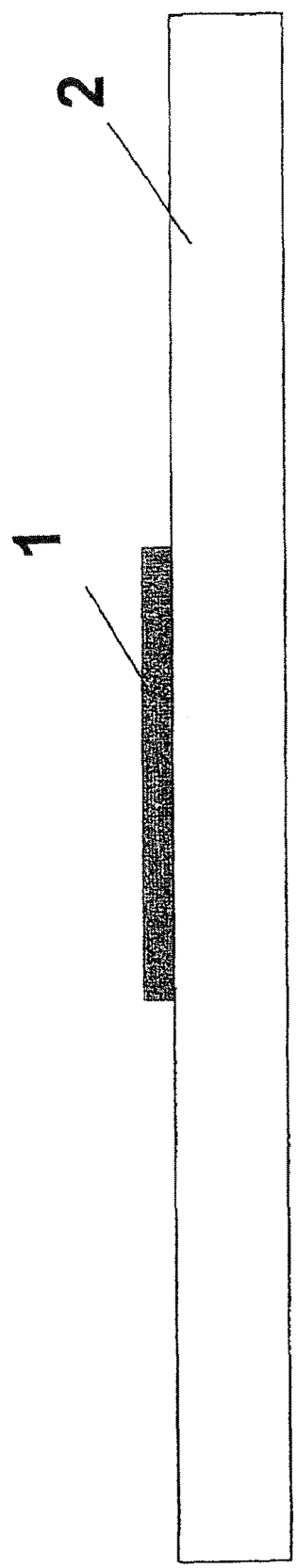
FIG. 1 shows a first electrocatalytic layer deposited on a smooth support in such a way that the first electrocatalytic layer is at least partially englobed in a catalyst coated membrane according to an embodiment of the invention.

An object of the present invention is a CCM comprising a membrane having on one of the two surfaces a first electrocatalytic layer containing a catalyst and on the other a second electrocatalytic layer containing a catalyst, wherein:
- the orthogonal projection of the perimeter of the first electrocatalytic layer on the second layer is distant from the perimeter of the second electrocatalytic layer at least 1 mm, preferably 2 mm in each point of said projection;
- the electrocatalytic layers and the membrane containing (per)fluorinated ionomers, preferably sulphonic ionomers having an equivalent weight in the range 380-1,700 g/eq, preferably 500-1,200 g/eq, the CCM having the following characteristics:
  - size variations, in the orthogonal directions of the plane xy, lower than 15%, more preferably lower than 10%, measured after CCM dipping in demineralized water at 100° C. for 30 minutes, dried at 105° C. under vacuum for one hour;
  - the CCM remains substantially unchanged after 60 cycles by dipping in water at 80° C. for 8 hours and then in water at the temperature of 25° C. for 16 hours, as the CCM electrocatalytic layers remain adherent to the membrane and no bubbles form at the interfaces between the membrane and the electrocatalytic layers.

As said, the perimeter projection of the first electrocatalytic layer on the second one is distant from the perimeter of the second electrocatalytic layer at least 1 mm, preferably 2 mm in each point of the projection. A maximum value of said distance does not exist, it is generally preferable that it is not higher than 3 mm to avoid that a significant part of the electrocatalytic layer surface remains unused during the utilization in electrochemical cell. It has been found by the Applicant that, by using the CCM of the invention in an electrochemical cell, no CCM breaks take place, in particular at the edges of the electrocatalytic layers.

In the CCM according to the present invention the two electrocatalytic layers and the membrane are clearly distinct among each other and the catalyst is substantially absent from the membrane.

The above CCM is obtainable with the process described below.

The (per)fluorinated ionomers usable for preparing the membranes and the electrocatalytic layers of the CCM of the present invention are obtainable from ionomers having the following units:
copolymers comprising:
- (A) monomeric units deriving from one or more fluorinated monomers containing at least one ethylenic unsaturation;
- (B) fluorinated monomeric units containing sulphonyl —SO$_2$F groups in amounts such that the ionomer has the equivalent weight in the above range; or homopolymers formed of monomeric units (B);
by hydrolysis of the —SO$_2$F groups to obtain the sulphonic groups in acid —SO$_3$H or salified form.

The fluorinated monomers (A) are selected from:
vinylidene fluoride (VDF);
$C_2$-$C_8$ perfluoroolefins, preferably tetrafluoroethylene (TFE);
$C_2$-$C_8$ chloro- and/or bromo- and/or iodo-fluoroolefins, as chlorotrifluoroethylene (CTFE) and bromotrifluoroethylene;
$CF_2$=$CFOR_{f1}$ (per)fluoroalkylvinylethers (PAVE), wherein $R_{f1}$ is a $C_1$-$C_6$ (per)fluoroalkyl, for example trifluoromethyl, bromodifluoromethyl, pentafluoropropyl;
$CF_2$=CFOX perfluoro-oxyalkylvinylethers, wherein X is a $C_{10}$-$C_{12}$ perfluoro-oxyalkyl having one or more ether groups, for example perfluoro-2-propoxy-propyl.

The fluorinated monomers (B) are selected from one or more of the following:

$F_2C=CF-O-CF_2-CF_2-SO_2F$;
$F_2C=CF-O-[CF_2-CX_AF-O]_{nA}-(CF_2)_{nB}-SO_2F$ wherein $X_A=Cl$, F or $CF_3$; nA=1-10, nB=2, 3;
$F_2C=CF-O-CF_2-CF_2-CF_2-SO_2F$;
$F_2C=CF-Ar-SO_2F$ wherein Ar is an aryl ring.

Optionally the sulphonic fluorinated ionomers of the invention can contain from 0.01% to 2% by moles of monomeric units deriving from a bis-olefin of formula:

$$R_1R_2C=CH-(CF_2)_m-CH=CR_5R_6 \quad (I)$$

wherein:
m=2-10, preferably 4-8;
$R_1$, $R_2$, $R_5$, $R_6$, equal to or different from each other, are H or $C_1$-$C_5$ alkyl groups.

Other usable monomers are those containing precursor groups which by hydrolysis are transformed into acid —COOH groups or corresponding salts; said monomers can be used in the place of —$SO_2F$ containing monomers, or in admixture with those containing —$SO_2F$ groups.

The fluorinated monomers (B) used to prepare the ionomers containing acid —COOH groups have the following structures:
$F_2C=CF-O-CF_2-CF_2-Y$;
$F_2C=CF-O-[CF_2-CX_AF-O]_{nA}-(CF_2)_{nB}-Y$ wherein $X_A=Cl$, F or $CF_3$; nA=1-10, nB=2, 3;
$F_2C=CF-O-CF_2-CF_2-CF_2-Y$,
$F_2C=CF-Ar-Y$ wherein Ar is an aryl group;
wherein Y is a precursor group of the carboxylic group, selected from the following: CN, COF, COOH, $COOR_B$, $COO^-Me^+$, $CONR_{2B}R_{3B}$, wherein $R_B$ is $C_1$-$C_{10}$, preferably $C_1$-$C_3$ alkyl and $R_{2B}$ and $R_{3B}$, equal or different, are H or have the meaning of $R_B$, Me is an alkaline metal.

As said, the fluorinated monomers (B) with end group Y having the above formulas can be in admixture with the fluorinated monomers containing sulphonyl groups —$SO_2F$, the total amount of the monomers (B) being such that the equivalent weight of the ionomer is in the above range.

Preferably the membranes and the electrocatalytic layers of the CCM of the present invention contain perfluorinated ionomers obtainable from ionomers comprising:
monomeric units deriving from TFE;
monomeric units deriving from $CF_2=CF-O-CF_2CF_2SO_2F$.

The hydrolysis of the precursors of acid functional groups of the ionomers comprises two steps; the first is carried out in basic environment and the second in acid environment, obtaining the ionomers with functional groups in the acid —$SO_3H$ and/or —COOH form.

For example, in case of sulphonyl precursor groups —$SO_2F$, they are transformed into sulphonic groups —$SO_3H$ by the following steps:
salification of the —$SO_2F$ form into the —$SO_3^-Me^+$ form, where Me is an alkaline metal;
acidification of the —$SO_3^-Me^+$ form into the —$SO_3H$ form.

The first step can for example be carried out by mixing the ionomeric polymer with an aqueous solution containing 10% by weight of KOH, at a temperature between 60° C. and 80° C., for a time higher than 2 hours, until disappearance of the —$SO_2F$ groups (IR analysis) and formation of the —$SO_3^-Me^+$ group. At the end of the salification step, the ionomer is washed with water at a temperature preferably not higher than 25° C. The acidification step is carried out, for example, by transferring the salified ionomer into an aqueous solution containing 20% by weight of HCl at room temperature and by keeping under stirring for at least half an hour. At the end a washing with water is carried out according to the above method.

The ionomeric polymers are available on trade. Those known with the trademark Nafion® can for example be mentioned.

The membranes and the electrocatalytic layers of the CCM of the present invention are prepared by starting from solutions and/or dispersions of the ionomers. See for example EP 1,004,615 and U.S. Pat. No. 4,433,082.

The membranes and the electrocatalytic layers of the CCM of the present invention have a thickness ranging from 3 micrometers to 100 micrometers. The membranes preferably from 10 to 80 micrometers, more preferably from 15 to 60 micrometers, the electrocatalytic layers preferably from 5 to 50 micrometers, more preferably from 5 to 30 micrometers.

The electrocatalytic layers comprise an ionomer and a catalyst, preferably Pt or a mixture of Pt with one or more metals, as, for example, Ru, Rh, Mo. Said catalyst is finely dispersed and preferably supported on carbon powder. The powders known with the following commercial names can for example be used: Vulcan XC-72, Ketjen Black, Black Pearls, Shawinigan Acetylene Black, etc. The ionomer has composition and/or equivalent weight equal to or different from the ionomer used in the membrane and/or in the other electrocatalytic layer. The ratio by weight between catalyst and ionomer in each of the two electrocatalytic layers ranges from 0.5 to 4, preferably from 0.5 to 2.5. The ratio by weight between the catalyst and the powder support is preferably higher than or equal to 10; when as fuel, hydrogen is used, the ratio is between 20 and 60, when methanol is used between 60 and 100.

The mg of catalyst metal/$cm^2$ of electrocatalytic layer ratio ranges from 0.01 to 2; when in the cell hydrogen is used as fuel, the ratio preferably ranges from 0.01 to 0.7 mg/$cm^2$, preferably by using at the cathode side a ratio ranging from 0.1 to 0.7 mg/$cm^2$; when methanol is used as fuel, said ratio preferably ranges from 0.3 to 1 mg/$cm^2$ at the anode side and from 0.5 to 2 mg/$cm^2$ at the cathode side.

A further object of the present invention is a process for preparing CCM according to the present invention comprising the following steps:
1) formation of the first electrocatalytic layer on the surface face of an inert support with the following steps:
   1a) preparation of a first liquid dispersion comprising an ionomer, in acid or salified form, and a catalyst, as defined above, wherein the ionomer concentration (in % by w.) ranges from 0.5% to 40%, preferably from 0.5% to 25%, the ratio by weight between catalyst and ionomer being from 0.5 to 4;
   1b) the dispersion prepared in 1a) is placed on the surface of an inert support;
   1c) removal of the solvent for at least 80% by weight with respect to the initial solvent of the dispersion, until obtaining a first electrocatalytic layer having:
      an extractable ionomer percentage, determined by the test described hereinafter, ≧80% by weight, even up to 100% with respect to the total ionomer present in the layer;
      a catalyst amount of electrocatalytic layer between 0.01 and 2 mg/$cm^2$;
2) on the first electrocatalytic layer obtained in step 1), formation of the ionomeric membrane through the following steps:
   2a) preparation of a liquid dispersion of an ionomer in acid or salified form, equal to or different from that used in step 1a) and having a concentration, (% by w.) on the total dispersion weight, from 3% to 40%, preferably from 7% to 25%;

2b) placing the liquid dispersion 2a) on the free surface of the first electrocatalytic layer;

2c) solvent removal for at least 80% by weight as in 1c), obtaining an ionomeric membrane on the top of the first electrocatalytic layer; the ionomer percentage extractable after this step being ≧80% by weight, even up to 100% with respect to the total ionomer present in the first catalytic layer and the membrane;

3) formation of the second electrocatalytic layer on the surface of the ionomeric membrane free from catalyst as obtained in step 2), to obtain the raw CCM on the inert support through the following steps:

3a) preparation of a second liquid dispersion comprising an ionomer, in acid or salified form, and a catalyst, wherein the ionomer concentration is (% by w.) between 0.5% and 40%, preferably between 0.5% and 25%, the catalyst/ionomer ratio (% by w.) being between 0.5 and 4; in said second dispersion the ionomer and/or the catalyst being equal to or different from those used in 1a) and in 2a);

3b) deposition of the liquid dispersion 3a) on the surface of the ionomeric membrane free from the catalyst prepared in 2) to form the second electrocatalytic layer positioned on the membrane so that the orthogonal projection of its perimeter on the first electrocatalytic layer is distant from the perimeter of the latter at least one millimeter, preferably two millimeters in each point of the projection;

3c) solvent removal for at least 80% by weight with respect to the initial solvent of the dispersion used, as in 1c), until obtaining the second electrocatalytic layer, having: a catalyst amount as indicated in 1c);

the ionomer percentage extractable after this step from the raw CCM (membrane+first and second electrocatalytic layer), determined with the test described hereinafter, being ≧80% by weight, even up to 100% with respect to the total weight of the ionomer present in the CCM;

4) annealing of the system (raw CCM supported on the inert support) at temperatures from 120° C. to 280° C. and obtainment of the CCM by separation of the inert support from the CCM.

In steps 1c) and 2c), as said, the solvent must be removed for at least 80% by weight (with respect to the initial amount), but it is preferable that some solvent remains present. In this way after the step 1c) and 2c) non consolidated systems are obtained. This means that the system placed in water/ethanol (60/40% by weight) at 50° C. for 22 hours, there would dissolve almost completely. Residual amounts of solvent up to 5% by weight with respect to the starting one are preferred.

Step 3c) can be carried out as steps 1c) and 2c) as regards the amount of residual solvent. Alternatively, in step 3c) the solvent can be removed even up to 100%.

When in the preparation of at least an electrocatalytic layer and/or of the membrane, as ionomers, copolymers containing units deriving from the sulphonic monomer (SSC) $CF_2=CF-O-(CF_2)_2SO_2F$ are used, the annealing of step 4) ranges from 130° C. to 280° C., preferably from 140° C. to 180° C., still more preferably from 140° C. to 160° C.

The percentage of extractable ionomer (by w.) is determined by dipping the sample, obtained at the end of the steps 1), 2), 3), in a water/ethanol mixture (the alcohol being 40% by weight) and maintaining the temperature of the mixture at 50° C. for 22 h, filtering on Whatmann 541 filter, drying the liquid phase filtered, drying the residue up to 80° C. until a constant weight. When the catalyst is present, a thermogravimetric analysis is carried out on the residue. Being known the amounts of the ionomer and of the catalyst, extractable ionomer percentage by w. is calculated.

As inert support it is meant a material substantially remaining chemically and physically unchanged under the conditions used for preparing the CCM. The inert support usable in step 1) can be any support preferably non porous and with smooth surfaces. Preferably it has a size variation in each of the two directions of the plane xy, measured at the temperature of step 4) for 15 minutes, not higher than 2%, preferably not higher than 1%. More preferably the support maintains substantially unchanged its properties at the temperatures of step 4). The support has shown an easy detachment of the CCM. The skilled in the art is able to determine the suitable support on the basis of the temperature of step 4). For example, the support can be non porous PTFE, polyimide, for example marketed with the trademark Kapton®, MFA, PFA, polyesters such as PET.

As said, the ionomer dispersions used in the process, can be prepared according to known techniques in the field. In steps 1a), 2a) and 3a), the solvent is selected from $C_1$-$C_3$, preferably $C_3$, alcohols, n-propanol and/or iso-propanol, or mixtures, preferably with water, of $C_1$-$C_3$ alcohols. Optionally other organic solvents can be used, provided that they are miscible with water and/or with the above alcohols. Examples of optional solvents are the following: dimethyl sulphoxide (DMSO), ethylene glycol (EG), N,N'-dimethylformamide (DMF), triethyl phosphate (TEP), 2-ethoxy-ethanol (2EE), N,N'-dimethylacetamide (DMA), N-methylpyrrolidone (NMP), acetonitrile (AN) and propylencarbonate (PC), fluoropolyoxyalkenes having one hydrogen atom at one or at both chain ends; the fluoropolyoxyalkenes preferably have boiling point between 80° C. and 120° C.

The dispersion, besides the ionomer and the catalyst, can contain other components, as (per) fluoropolymer fillers; inorganic fillers as, for example, silica, Zr or Ti acid phosphates, surfactants.

In steps 1a) and 3a), the dispersion is preferably prepared first by dissolving or dispersing the ionomer in the solvent and then dispersing the catalyst. This order of addition of the components of the dispersion has the advantage that a final dispersion sufficiently stable is obtained, without separation of the catalyst.

The deposit of the dispersions in steps 1b), 2b) and 3b) is carried out according to known techniques. For example spray coating, casting with knife, kiss-coating, serigraphy, ink-jetting, curtain coating, etc. can be mentioned.

In step 1b) the deposit of the first electrocatalytic or electrodic layer can be carried out as illustrated in FIG. 1, wherein 1 is the first electrodic layer and 2 is a smooth support. In this case, in the final CCM the first electrodic layer is at least partially englobed in the membrane.

Figure 2:
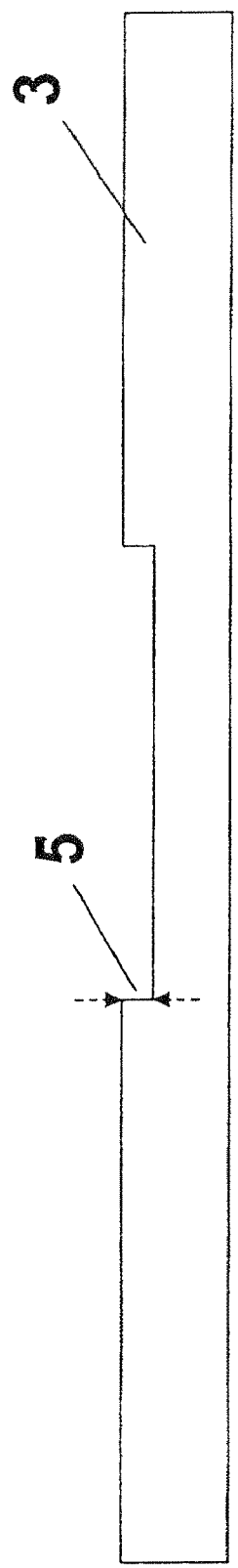
FIG. 2 shows a support wherein an impression is formed for the deposition of a first electrocatalytic layer according to another embodiment of the invention.
Figure 2B:
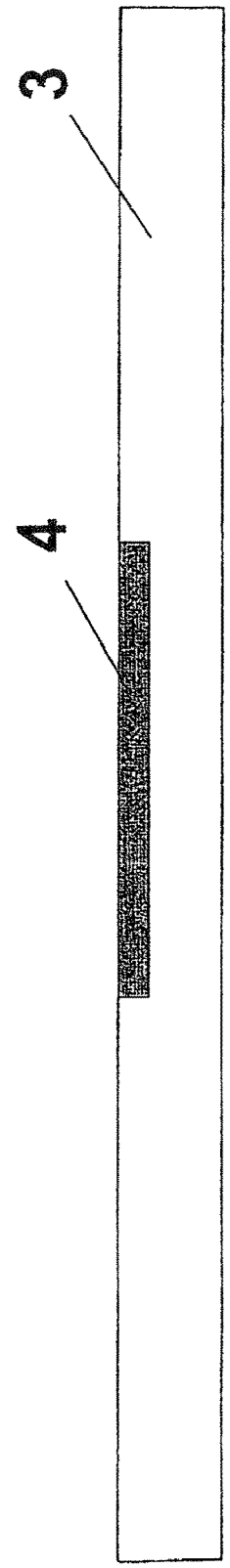
FIG. 2b shows a first electrocatalytic layer deposited on a support in such a way that the first electrocatalytic layer is outside a catalyst coated membrane according to another embodiment of the invention.

Alternatively, in step 1b) the deposit of the first electrocatalytic or electrodic layer is carried out as illustrated in FIG. 2b on a support 3 containing an impression corresponding to the form of the first electrodic layer 4, removing the excess of the dispersion 1a); the height of the first electrodic layer, after solvent evaporation (step 1c)), must be equal to the height 5 of the impression (FIG. 2). Therefore, by using this deposition method, in the final CCM the first electrodic layer is outside the membrane.

Preferably the obtainment of the first electrocatalytic layer in step 1) of the process of the present invention is carried out, see FIG. 3, through the following steps:

on the support 2 is placed a thin and flat sheet or mask 6, wherein a window having the perimeter of a regular flat figure is cut out, for example a parallelogram, corresponding to the form of the electrodic layer;

deposit of the dispersion prepared in 1a) (step 1b) in the window of the thin sheet, removing the excess of the dispersion by a blade running in contact with the surface of the sheet 6;

solvent removal (step 1c);

removal of the sheet 6.

The height of the sheet 6 is selected so to obtain a catalyst amount/surface unit ratio of the electrodic layer in the above range.

In step 2a) the ionomeric dispersion used for forming the membrane has a sufficiently high viscosity, generally higher than 100 cP (measured at 25° C. and at a shear rate of 0.1 sec$^{-1}$), preferably higher than 500 cP. A sufficiently high viscosity avoids, during the membrane deposition, that the first not consolidated electrodic layer is accidentally removed and that the dispersion used for the membrane deposition penetrates inside the pores of the first electrodic layer.

In step 2b) the membrane deposit is preferably carried out with a continuous process of solutions or dispersions, as casting with knife, curtain coating, etc.

The same above described process for obtaining the first electrodic layer using the sheet or mask 6 can be repeated to obtain the second electrodic layer according to the steps 3a)-3c), by applying in this case the sheet 6 on the uncoated surface of the membrane. Preferably, in this case, mask 6 is removed before the solvent removal step 3c). As said above, the window cut out from sheet 6 has shape and sizes and is positioned on the membrane so that the orthogonal projection of its perimeter on the first electrocatalytic layer is distant from the perimeter of the latter at least one millimeter, preferably two millimeters in each point of the projection.

The obtainment of the CCM as indicated in FIG. 3, wherein the mask 6 is used for building the electrodes, can preferably be carried out in a continuous way.

Figure 4:
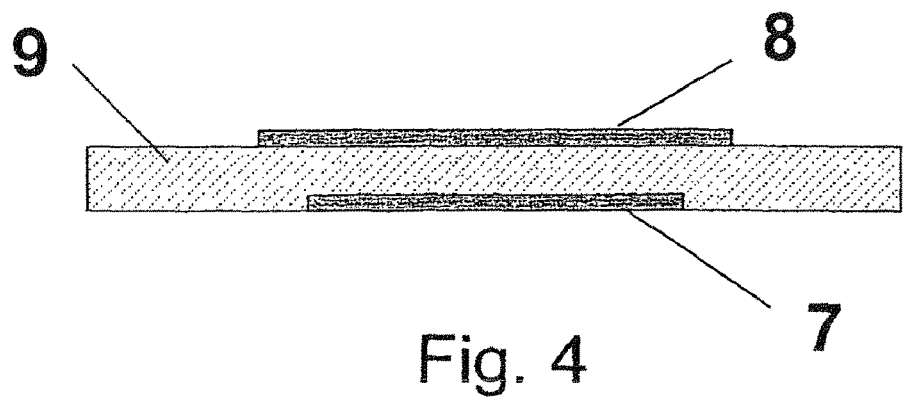
FIG. 4 shows a transversal section of a catalyst coated membrane according to another embodiment of the invention.
Figure 4B:
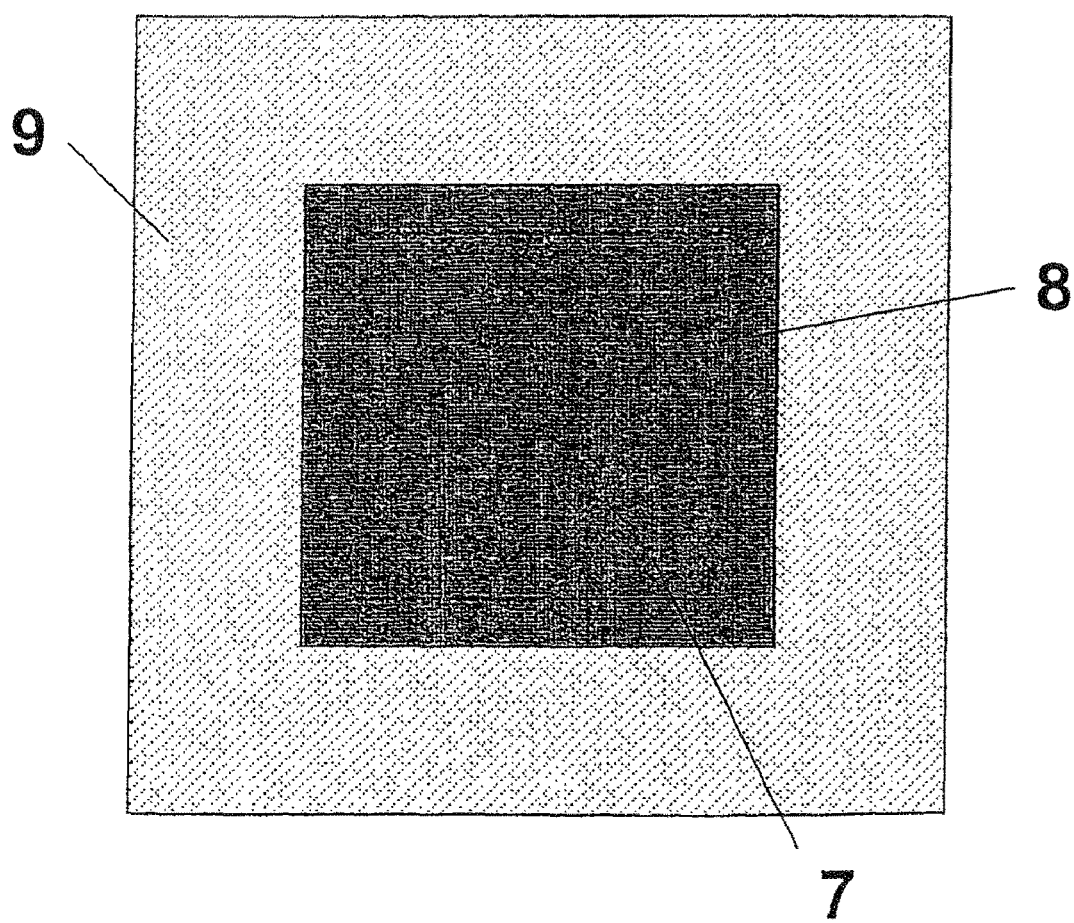
FIG. 4b shows a top view of a catalyst coated membrane according to another embodiment of the invention.

In FIG. 4 the transversal section of the CCM is represented, 7 and 8 being the electrocatalytic layers and 9 the membrane. It is noted that the orthogonal projection of the edges of the electrocatalytic layer 8 falls outside the edges of the electrocatalytic layer 7. In FIG. 4b the same CCM is represented, seen from the top. The edges of the electrocatalytic layer 7, placed underneath the membrane and therefore not visible, are represented by a discontinuous line.

In steps 1c), 2c), 3c) the solvent removal is carried out by thermal treatment at 45°-95° C., by preferably operating at atmospheric pressure, until obtaining a content of residual solvent in the above limits. For example by operating at a temperature of 65° C. a time of 30-45 minutes is required.

After the step 3c), one passes to step 4), preferably by using a thermal gradient of about 10° C. in the time of 3-30 minutes, preferably 10-20 minutes. A thermal gradient of 1° C./minute is generally used.

It has been found by the Applicant that the steps 1c), 2c), 3c) and the thermal treatment 4) are essential for obtaining and maintaining in the time, under the use conditions, the CCM integrity and to have a high CCM endurance. The latter feature is in particular obtained if the above thermal gradient is used.

The time employed in step 4) depends on the thermal treatment temperature. Usually, a time generally higher than 15 minutes and lower than 10 hours is required. For example, by operating at 170° C., times between about 30 minutes and 1 hour are generally sufficient.

The separation of the CCM from the support can be carried out in dry conditions, or by dipping in water, generally at temperatures in the range 20°-25° C.

The process of the present invention shows the following advantages compared with those of the prior art for preparing CCM:

in all the steps the layers forming the final CCM are supported, therefore the drawbacks occurring when coupling unsupported membranes are eliminated;

in the preparation of the CCM the membrane is deposited on the first electrocatalytic layer and the second electrocatalytic layer is deposited on the membrane after evaporation of the solvent in the indicated percentages but the extractable ionomer percentage being higher than or equal to 80%. In this way it has been found that an optimal adhesion among the various interfaces is obtained and thus the integrity of the CCM is obtained under the use conditions, even in the most drastic ones, for prolonged times;

when the membrane, obtained at the end of step 2c), is contacted with the dispersion of the catalytic layer in step 3b), it does not show any size variation;

the three layers forming the CCM show the same size variation in the two orthogonal directions of the plane xy as there is no delamination among the layers;

the membrane and the two electrode layers are contemporaneously annealed in step 4), thus creating an optimal adhesion and lasting in the time among the CCM layers;

the CCM obtained by annealing on the support gets a high dimensional stability;

by carrying out the evaporation of the solvent at the end of each single step of the process, before the deposit of the successive layer, the catalyst remains in the electrocatalytic layer and there is no substantial migration thereof into the membrane layer. This has the advantage that the catalyst is wholly used for the electrocatalytic reaction. This brings to improved CCM compared with the cases wherein the catalyst migrates inside the membrane. From the industrial point of view, this represents a remarkable advantage as the catalyst has a significant incidence on the total cost of the manufactured article.

By using the method of the present invention a CCM is obtained wherein the electrode-membrane contact is optimal. The Applicant has found that the direct deposition of the second catalytic layer on the membrane previously annealed brings to the obtainment of CCM having poor properties as an unhomogeneous and discontinuous catalytic film is formed.

With the process of the invention the hot transfer and under pressure steps of the catalyst on the membrane, used in the prior art for obtaining the CCM (decal process), are eliminated. It has been found by the Applicant that these steps negatively affect the performances in cell and the duration of the CCM.

The preparation of the ionomers can be carried out with a mass, suspension, emulsion radical polymerization process.

The aqueous emulsion or microemulsion polymerization can for example be mentioned. The surfactants usable in these polymerizations are (per)fluorinated, for example salts (as defined below) of the perfluorooctanoic, perfluorononanoic, perfluorodecanoic acid, or their mixtures, etc., (per)fluoropolyethers with one acid end group (for example COOH, SO$_3$H), salified with NH$_4^+$ or with alkaline metal cations, the other end group being (per)fluorinated, optionally containing one H or Cl atom. The number average molecular weights of the perfluoropolyether surfactants generally range from 300 to 1,800, preferably from 350 to 750. The microemulsion polymerization is well known in the art. In particular the ionomer preparation is carried out by using an aqueous emulsion wherein, in the reaction medium, as surfactants, those of formula:

are used, wherein:

$X_1$ is equal to —COO, —$SO_3$;

M is selected from H, $NH_4$ or an alkaline metal;

$R_f$ represents a (per)fluoropolyether chain, preferably having number average molecular weight in the range from about 230 to about 1,800, preferably from 300 to 750, said (per)fluoropolyether chain comprising repeating units selected from one or more of the following:
a) —($C_3F_6O$)—;
b) —($CF_2CF_2O$)—;
c) —($CFL_0O$)—, wherein $L_0$=—F, —$CF_3$;
d) —$CF_2(CF_2)_{z'}$—$CF_2O$—, wherein z' is an integer 1 or 2;
e) —$CH_2CF_2CF_2O$—.

$R_f$ is monofunctional and has a (per)fluorooxyalkyl end group T, for example $CF_3O$—, $C_2F_5O$—, $C_3F_7O$—; optionally in perfluoroalkyl end groups one fluorine atom can be substituted with one chlorine or hydrogen atom. Examples of these end groups are $Cl(C_3F_6O)$—, $H(C_3F_6O)$—. The unit a) $C_3F_5O$ is —$CF_2$—$CF(CF_3)O$— or —$CF(CF_3)CF_2O$—.

In the above formula $R_f$ preferably has one of the following structures:

1) T-$(CF_2O)_a$—$(CF_2CF_2O)_b$—$CF_2$—
b, a being integers,
with b/a between 0.3 and 10 where a is different from 0, extremes included, a being an integer different from 0;

2) T-$(CF_2$—$(CF_2)_{z'}$—$CF_2O)_{b'}$—$CF_2$—
b' and z' being integers,
wherein z' is an integer equal to 1 or 2;

3) T-$(C_3F_6O)_r$—$(C_2F_4O)_b$—$(CFL_0O)_t$—$CF_2$—
r, b, t, being integers,
with r/b ranging from 0.5 to 2.0 where b is different from 0;
(r+b)/t ranges from 10 to 30, where t is different from 0;

a, b, b', r, t are integers, their sum is such that $R_f$ has the above values of number average molecular weight.

The compounds wherein $R_f$ has the following formula:

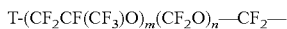

T-$(CF_2CF(CF_3)O)_m(CF_2O)_n$—$CF_2$— m, n being integers;
m/n ranges from 1 to 30;
wherein T=—$OCF_3$ or —$OCF_2Cl$,
are still more preferred.

The (per)fluoropolyethers $R_f$ are obtainable with the well known processes in the prior art, see for example the following patents herein incorporated by reference: U.S. Pat. No. 3,665,041, U.S. Pat. No. 2,242,218, U.S. Pat. No. 3,715,378 and the European patent 239,123. The fluoropolyethers functionalized with hydroxyl termination are obtained for example according to EP 148,482, U.S. Pat. No. 3,810,874. The end functional groups are obtained with the processes indicated in said patents.

Chain transfer agents can be used in the polymerization. For example alkaline or earth-alkaline metal iodides and/or bromides, according to U.S. Pat. No. 5,173,553. Chain transfer agents containing hydrogen, as hydrocarbons, alcohols, in particular ethyl acetate and ethane are preferably used.

The polymerization initiators used in the process of the present invention are preferably radical inorganic initiators, as, for example, ammonium and/or potassium and/or sodium persulphate, optionally in combination with ferrous, cuprous or silver salts. The procedures of the initiator feeding into the polymerization reactor can be in a continuous way or by a single addition at the beginning of the polymerization.

The polymerization reaction is generally carried out at temperatures in the range 25° C.-70° C., preferably 50° C.-60° C., under pressure up to 30 bar (3 MPa), preferably higher than 8 bar (0.8 MPa).

Monomer (B) is fed into the poylmerization reactor in a continuous way or by steps.

After the polymerization is completed, the ionomer is isolated by conventional methods, as the coagulation by addition of electrolytes or by freezing.

The CCM of the present invention can be used in electrochemical cells, in particular in fuel cells.

The following Examples are given for illustrative and not limitative purposes of the present invention.

EXAMPLES

Characterization

Determination of Equivalent Weight

About 1 gram of the polymer is dried at 150° C. for 40 h. From the dried powder a thin film of about 100 µm is obtained by molding in press at the temperature of 280° C. The so obtained film is treated at 80° C. for 24 h with KOH at 10% by weight, then washed with demineralized water and then treated at room temperature for 24 h with HCl at 20% by weight. At the end it is washed with demineralized water. In this way the sulphonyl groups of the film are converted into acid sulphonic groups.

The polymer film in acid form is dried at 105° C. up to a constant weight and weighed; then the film is suspended in a hydroalcoholic or an aqueous solution, an excess of a titrated NaOH solution is added and it is titrated back with a HCl titrated solution. The equivalent weight is determined by the ratio between the weight of the film, expressed in grams, and the number of equivalents of titrated acid groups.

Determination of the Performance in Fuel Cell

The CCM is assembled between two gas diffusion layers ELAT®/nc/ss/V2 (E-TEK, Inc.) having 10 $cm^2$ area; the cell is fed from the anode side with hydrogen and from the cathode side with air. The gas feeding pressure to the cell is equal and is 0.25 MPa. The cell temperature is maintained at 75° C. and the feeding gases are previously saturated with water at 80° C.

By a load applied to the circuit outside the cell, the current intensity is stabilized maintaining the voltage at 0.4 Volt. Then the current intensity (current per surface unit of electrode) is regulated and the voltage is measured at the two poles of the cell. The operation is repeated by using different external loads and the voltage obtained at different current intensities in the cell is determined. In particular the voltage obtained at 0.2 and 1 A/$cm^2$ is determined.

Evaluation of the Integrity of the CCM after Prolonged Contact with Water

The test is indicative of the integrity of the CCM under the use conditions in fuel cell.

The CCM is dipped in demineralized water at the temperature of 80° C. for 8 hours. The CCM is then transferred into demineralized water at room temperature for 16 hours. The procedure is repeated for 60 times in all. At the end of the test the integrity of the CCM is examined for the possible detachment of one or more layers, and for the presence of cracks or bubbles in correspondence with the interfaces among the layers.

The CCM, if it appears integral, is left dipped in water, at room temperature, and one stirs with a glass rod for two minutes and observes if during this time the possible detachment of layers takes place.

Determination of the Size Variations of the CCM in the Two Orthogonal Directions Of the Plane The CCM is cut out so as to obtain a squared membrane, having 7×7 cm side with the electrocatalytic layer in central position and having 3.2×3.2 cm sizes.

The CCM is initially dried at 105° C. under vacuum for 1 hour. The CCM membrane sizes are determined. The CCM is then hydrated with demineralized water at 100° C. for 30 minutes; after removal from water it is determined how much the membrane has stretched in the two plane directions.

The size variations in the two orthogonal directions are calculated as percent referred to the starting sizes, after drying at 105° C. under vacuum for 1 hour.

Determination of the Extractable Ionomer

The extractable ionomer is determined by dipping the piece, for example the membrane, in a water/ethanol mixture containing 40% by weight of alcohol and maintaining the mixture temperature at 50° C. After 22 h one filters on Whatman filter 541 and the filtered liquid phase is dried. It is dried at 80° C. up to constant weight, obtaining the total amount of ionomer extracted. This amount, divided by that of the ionomer present in the piece, gives the percentage of the extractable ionomer, solubilized under the conditions used in the test.

In case where the ionomer is extracted from a piece of the CCM comprising at least an electrocatalytic layer, on the obtained residue a thermogravimetric analysis is carried out to determine the amount of catalyst present. The final temperature of the thermogravimetric analysis is 600° C. The weight of the obtained residue corresponds to that of the catalyst present.

Determination of the Viscosity of the Dispersion

The viscosity (Brookfield) is determined by a viscometer Synchro Electric® LVT model, measured at 25° C. with rotor No. 4 at 60 rpm.

Example 1

Preparation of the Ionomer in SO$_3$H Form

In a 22 litre autoclave the following reactants are introduced:
- 11.5 litres of demineralized water;
- 980 g of the monomer of formula $CF_2\!=\!CF\!-\!O\!-\!CF_2CF_2\!-\!SO_2F$;
- 3,100 g of an aqueous solution at 5% by weight of a fluoropolyoxyalkylene having acid end group with number average molecular weight 521 potassium salified, of formula: $CF_2ClO(CF_2CF(CF_3)O)_n(CF_2O)_mCF_2COOK$ wherein n/m=10.

The autoclave, kept under stirring at 540 rpm, is heated to 60° C. Then 225 ml of an aqueous solution having a concentration of 6 g/l of potassium persulphate (KPS) are fed into the autoclave. The pressure is brought to 1.3 MPa absolute by introducing TFE. The reaction starts after 4 min. The pressure is maintained at 1.3 MPa absolute by feeding TFE. After 1,000 g of TFE have been fed into the reactor, 175 g of the sulphonic monomer of formula $CF_2\!=\!CF\!-\!O\!-\!CF_2\!-\!CF_2\!-\!SO_2F$ are introduced. Then 175 g of the same sulphonic monomer are introduced in the reactor every 200 g of TFE fed. The total TFE mass fed to the reactor is 4,000 g.

The reaction is stopped after 233 minutes by interrupting the TFE feeding, cooling and venting the reactor under vacuum. The produced latex has a solid content of 28.5% by weight. The latex is coagulated by freezing and defrosting, the polymer separated from the mother liquors, washed with water up to constant pH of the washing waters.

The equivalent weight of the copolymer is 870 g/eq, corresponding to a composition 85.5% molar of TFE and 14.5% molar of sulphonic monomer.

A part of the polymer is separated from the washing waters and is treated with a 20% by weight KOH solution at 80° C. for 6 hours, by keeping under stirring. For one part by weight of polymer 10 parts by weight of KOH solution are charged. At the end it is washed with demineralized water up to stable pH of the washing waters. 10 parts by volume are added for one part by weight of polymer of a 20% HCl solution, maintaining under stirring at room T for 2 h. At the end it is washed with demineralized water up to stable pH of the washing waters. The addition steps of the HCl solution and of the subsequent washing with water are repeated for other two times. At the end the polymer in the SO$_3$H form is recovered and dried for 40 h at 80° C.

Example 2

Preparation of the Dispersion of the Ionomer

An 8.6% by weight dispersion of the sulphonic ionomer obtained in the Example 1 is prepared by dissolving 18.8 g of ionomer in 200 g of a quaternary mixture composed of 39 g of H$_2$O, 80 g of isopropanol, 80 g of n-propanol and 1 g of a fluoropolyoxyalkylene having formula:

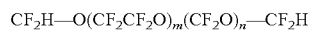

with boiling range between 80° C. and 120° C. and number average molecular weight equal to 350. The dissolution is carried out at room temperature in 24 hours in a glass vessel equipped with mechanical stirrer. At the end the dispersion has a viscosity of 1,000 cP.

Example 3

Preparation of an Ionomer Dispersion and Catalyst

A 3% by weight dispersion of the sulphonic ionomer obtained in the Example 1 is prepared by dissolving 3.1 g of ionomer in 100 g of a quaternary mixture composed of 19.5 g of H$_2$O, 40 g of isopropanol, 40 g of n-propanol and 0.5 g of a fluoropolyoxyalkylene having formula:

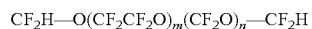

with boiling range between 80° C. and 120° C. and number average molecular weight equal to 350. The dissolution is carried out at room temperature in 24 hours in a glass vessel equipped with mechanical stirrer.

To the so obtained ionomer dispersion, maintained under stirring by magnetic stirrer, 26.9 g of Pt catalyst are added, under nitrogen flow, supported on Vulcan XC 72 (E-Tek) carbon, containing 30% by weight of Pt with respect to the carbon. The ratio by weight platinum/ionomer is 2/1.

Example 4

Preparation of a CCM According to the Invention

To a non porous PTFE support (ref. 2 in FIG. 3) previously weighed a Kapton® mask (6 in FIG. 3) is applied having a thickness of 50 μm and in the middle a square blank space of 10 cm$^2$ area (side 3.2 cm).

Along the whole length of one side of the blank space, a strip of the dispersion of the Example 3 is deposited on the mask to form the electrocatalytic layer. With a stratifying Braive® knife set at knife height zero, placed parallelly to the considered side of the blank space and which moves perpendicularly to it, the dispersion is spread on the whole surface of the blank space of the mask, so as to fill it.

It is transferred into an oven at 65° C. for 30 minutes to evaporate the solvent. At the end it is extracted from the oven and the mask is removed obtaining on the support the first electrocatalytic layer in correspondence of the blank space of the mask. It is weighed and, on the basis of the area of the electrocatalytic layer, it is found that the platinum amount of the electrocatalytic layer is equal to 0.35 mg/cm$^2$.

The ionomeric membrane of the CCM is prepared by initially depositing on the support, parallelly to a side of the first electrocatalytic layer, a strip of the dispersion of the Example 2, having a length of about 10 cm and distant about 4 cm from the considered side of the electrocatalytic layer. The deposition is carried out so that the strip results nearly equally protruding with respect to the edges of the considered side of the electrocatalytic layer. With a stratifying Braive® knife, set at knife height 1,100 μm, placed parallelly to the side of the electrocatalytic layer, and which is moved perpendicularly to said side, the dispersion is spread so as to coat the first electrocatalytic layer and over, up to a distance of at least 4 cm with respect to the side parallel to that considered of the electrocatalytic layer. It is dried in a stove at 65° C. for 30 minutes evaporating the solvent. In this way the ionomeric membrane is formed over the first electrocatalytic layer.

On the free surface of the so obtained ionomeric membrane a Kapton® mask (polyimide) with a thickness of 50 μm is placed, having in the middle a square blank space of 13 cm$^2$ area (side 3.6 cm). The mask is positioned so that the blank space is centered with respect to the first electrocatalytic layer.

The above process is repeated to obtain the first electrocatalytic layer until the deposition of the dispersion of the Example 3 with a stratifying Braive® knife. The mask is taken off and it is transferred into the oven at 65° C. for 30 minutes to evaporate the solvent. Then the temperature is gradually increased (10° C./10 min) up to 150° C. (annealing temperature). The second electrocatalytic layer is in this way obtained on the free surface of the ionomeric membrane, and thus the raw CCM, which is supported on the PTFE support.

The temperature of 150° C. is maintained for 90 minutes so as to carry out the annealing phase. At the end it is taken out from the oven and the PTFE support is removed obtaining the CCM according to the present invention.

The disposition of the two electrocatalytic layers is illustrated in FIGS. 4 and 4b, wherein 7, 8 show the electrocatalytic layers and 3 indicates the membrane.

Determination of the Percentage of the Extractable Ionomer

The preparation of the first electrocatalytic layer is repeated. It is found that the percentage of the extractable ionomer is higher than 95%.

The preparation process of the first electrocatalytic layer+ionomeric membrane as described above is repeated. It is found that the percentage of the extractable ionomer is higher than 95%.

The preparation process of the first electrocatalytic layer+ionomeric membrane+second electrocatalytic layer as described above is repeated, without carrying out the annealing step. It is found that the percentage of the extractable ionomer is higher than 95%.

The extractable ionomer amount determined on the CCM after final thermal treatment is lower than 10%.

Example 4a

Performance in Fuel Cell of the CCM of the Example 4

The CCM of the previous Example is subjected to the above described test in fuel cell. The obtained results are the following: at 0.2 A/cm$^2$ the voltage is 0.81 V and at 1 A/cm$^2$ the voltage is 0.66 V. At the end of the test it is noted that, disassembling the cell, the structural integrity of the CCM is maintained.

Example 4b

Integrity Test of the CCM of the Example 4 by Prolonged Contact with Water

The CCM of the Example 4 is subjected to the above test of prolonged contact with water. At the end of the test the CCM appears integral, even after having left the CCM in water, at room temperature, and having stirred with a glass rod for two minutes. In particular it is not observed the presence of cracks or bubbles in correspondence of the interfaces among the layers.

Example 4c

Size Variations of the CCM of the Example 4

The CCM of the Example 4 is subjected to the above test to determine the size variations. At the end of the test the dimensional variations in the two orthogonal directions are the same and equal to 8%.

Example 5

Comparative

Preparation of a CCM According to the Prior Art by the Process Called "Decal"

According to this process each electrocatalytic layer and the ionomeric membrane are separately prepared and lastly assembled to form the CCM.

By using the dispersion of the Example 3, the two electrocatalytic layers of the CCM are separately prepared by the process described in the Example 4 to prepare the first electrocatalytic layer.

By using the dispersion of the Example 2, the ionomeric membrane is separately prepared on a support by the process described to prepare the ionomeric membrane of the CCM of the Example 4.

The two electrocatalytic layers and the membrane, after the thermal treatment to evaporate the solvent, are separately heated gradually (10° C./10 min) from the temperature of 65° C. (temperature of solvent removal) to the temperature of 150° C. (annealing temperature). The temperature of 150° C. is maintained for 90 minutes.

The CCM is assembled by detaching the membrane from the support and interposing it between the free surfaces of the two electrocatalytic layers, which are attached to the respective support. On the free surface of each support a pressure of 20 bar is applied, heating to 150° C. during the setting in press. The two electrocatalytic layers are in this way transferred from the respective supports and adhere respectively to each of the two membrane surfaces, forming a CCM.

Determination of the Percentage of the Extractable Ionomer

The preparation of an electrocatalytic layer and of the membrane is repeated, including the final treatment at 150° C. It is found that the percentage of the extractable ionomer in both cases is lower than 50%.

Example 5a

Comparative

Performance in Fuel Cell of the CCM of the Example 5 (Comparative)

The CCM of the previous Example is subjected to the above test in fuel cell. The obtained results are the following: at 0.2 A/cm$^2$ the voltage is 0.77 V and at 1 A/cm$^2$ the voltage is 0.58 V. At the end of the test it is noted that, by disassembling the cell, the structural integrity of the CCM is maintained.

Example 5b

Comparative

Integrity Test of the CCM of the Example 5 (Comparative) by Prolonged Contact with Water The CCM of the Example 5 (comparative) is subjected to the above test of prolonged contact with water. At the end of the test the CCM appears integral but bubbles are noticed in correspondence of the interfaces among the layers. Besides, by leaving the CCM in water at room temperature and stirring with a glass rod for two minutes, it is observed the detachment of the electrocatalytic layers of the membrane.

Example 5c

Size Variations of the CCM of the Example 5 (Comparative)

The CCM of the Example 5 (comparative) is subjected to the above test to determine the size variations. At the end of the test the size variations in the two orthogonal directions are the same and equal to 8%.

Example 6

Comparative

Preparation of a CCM According to Patent Application US 2003/0219532

Two membranes are separately prepared on as many supports by using the dispersion of the Example 2 with the process described in the Example 4 for preparing the ionomeric membrane, but using the stratifying Braive® knife set at knife height of 550 μm. This height is the half of that set in the case of the obtainment of the ionomeric membrane of the Example 4. Besides, differently from the Example 4, in this case on the support on which each ionomeric membrane is prepared by casting there is not the first electrocatalytic layer.

Then, on each of the two membranes an electrocatalytic layer is prepared by using the dispersion of the Example 3, by the process described in the Example 4 for preparing the second electrocatalytic layer on the free surface of the membrane, using a Kapton® mask having in the middle a square blank space of 10 cm$^2$ area.

After having removed the solvent from each electrocatalytic layer, it is found that it is not possible to remove each membrane with the corresponding electrocatalytic layer without compromising the integrity thereof.

Therefore the membrane and the respective electrocatalytic layer are treated as described in the process according to the present invention. It is gradually heated (10° C./10 min) from the temperature of 65° C. (temperature of solvent removal) to the temperature of 150° C. The temperature of 150° C. is then maintained for 90 minutes. After this treatment it is possible to detach the membranes with the respective electrocatalytic layers from the supports.

By a brush an aliquot of the dispersion of the Example 2 is applied to the free surface of each of the two membranes, said surfaces are then put into contact and transferred into a press, where they are subjected to a pressure of 20 bar at a temperature of 80° C. for one hour.

Example 6a

Comparative

Performance in Fuel Cell of the CCM of the Example 6 (Comparative)

The CCM of the previous Example is subjected to the above test in fuel cell. The obtained results are the following: at 0.2 A/cm$^2$ the voltage is 0.81 V and at 1 A/cm$^2$ the voltage is 0.66 V. At the end of the test it is noted that, by disassembling the cell, the structural integrity of the CCM is lost as the membrane with each of the two electrocatalytic layers divides into the corresponding membranes, containing each of the two electrocatalytic layers, which were previously assembled to form the CCM.

Example 6b

Comparative

Integrity Test of the CCM of the Example 6 (Comparative) by Prolonged Contact with Water The CCM of the Example 6 (comparative) is subjected to the above test of prolonged contact with water. At the end of the test the structural integrity of the CCM results lost as the same inconvenience, found by disassembling the cell at the end of the test described in the Example 6a—performance in fuel cell—arises.

Example 7

Comparative

Preparation of a CCM by Following the Method of the Invention Until Obtaining the First Electrocatalytic Layer+Ionomeric Membrane but by Treating at 150° C. for 90 Minutes Before the Application of the Second Electrocatalytic Layer The process of the Example 4 is followed until obtaining the assembly first electrocatalytic layer+membrane.

After the solvent removal (65° C. for 30 minutes) the temperature is gradually increased (10° C./10 min) up to 150° C. (annealing temperature) and this temperature is maintained for 90 minutes.

It is cooled at room temperature and the dispersion of the Example 3 is deposited on the free membrane surface, by using the process described in the Example 4 to prepare the second electrocatalytic layer.

It is noted that the dispersion does not homogeneously film and therefore it is not possible to prepare the second electrocatalytic layer.

Determination of the Percentage of the Extractable Ionomer on the Assembly First Electrocatalytic Layer+Ionomeric Membrane The above process is repeated, including the final thermal treatment at 150° C. It is found that the percentage of the extractable ionomer is lower than 50%.

This Example shows that, in the process of the present invention, the thermal treatment step 4) must be carried out at the end of the formation of the layers forming the CCM.

Example 8

Comparative

A part of the polymer in the $SO_2F$ form of the Example 1 is dried at 150° C. for 40 h and subjected to extrusion at 245° C. by Braebender extruder to obtain granules. Then the granules are extruded at 250° C., obtaining a film having a thickness of 30 μm.

A part of the obtained film is treated at 80° C. for 24 h with KOH at 10% by weight, then washed with demineralized water and then treated at room temperature for 24 h with HCl at 20% by weight. At the end it is washed with demineralized water. In this way the sulphonyl groups of the film are converted into acid sulphonic groups.

The process for preparing the electrocatalytic layers and the final CCM assembling of the Example 5 (comparative) is repeated, but by using the membrane obtained by extrusion.

Determination of the Percentage of the Extractable Ionomer on the Extruded Membrane On a piece of the membrane with acid sulphonic groups obtained from the extruded film the extractable ionomer percentage is determined. It is found that the percentage of the extractable ionomer is lower than 10%.

Example 8b

Comparative

Integrity Test of the CCM of the Example 8 (Comparative) by Prolonged Contact with Water The CCM of the Example 8 (comparative) is subjected to the above test of prolonged contact with water. At the end of the test it is found that the electrocatalytic layers have detached from the membrane.

Example 8c

Comparative

Size Variations of the CCM of the Example 8 (Comparative)

The CCM of the Example 8 (comparative) is subjected to the above test to determine the size variations. At the end of the test the size variations in the two orthogonal directions are respectively 9% in the extrusion direction (MD) and 20% in the orthogonal direction to the extrusion one (TD).

The invention claimed is:

1. A process for preparing a catalyst coated membrane (CCM), comprising the following steps:
    1) formation of a first electrocatalytic layer on the surface of an inert support with the following steps:
        1a) preparation of a first liquid dispersion comprising an ionomer, in acid or salified form, and the catalyst, wherein the ionomer concentration (in % by w.), ranges from 0.5% to 40%, the ratio by weight between catalyst and ionomer being from 0.5 to 4;
        1b) the dispersion prepared in 1a) is placed on the surface of an inert support;
        1c) removal of the solvent for at least 80% by weight with respect to the initial solvent of the dispersion, obtaining a first electrocatalytic layer having:
            an extractable ionomer percentage ≧80% by weight with respect to the total ionomer present in the layer;
            a catalyst amount in $mg/cm^2$ of electrocatalytic layer between 0.01 and 2 $mg/cm^2$;
    2) on the first electrocatalytic layer formation of an ionomeric membrane through the following steps:
        2a) preparation of a liquid dispersion of an ionomer in acid or salified form, equal to or different from that used in step 1a) and having a concentration (% by w.) on the total dispersion weight, from 3% to 40%;
        2b) the liquid dispersion 2a) is placed on the free surface of the first electrocatalytic layer;
        2c) solvent removal for at least 80% by weight as in 1c), obtaining an ionomeric membrane on the top of the first electrocatalytic layer; the ionomer percentage extractable after this step being ≧80% by weight with respect to the total ionomer present in the first catalytic layer and the membrane;
    3) formation of a second electrocatalytic layer on the surface of the ionomeric membrane free from catalyst to obtain the raw CCM on the inert support through the following steps:
        3a) preparation of a second liquid dispersion comprising an ionomer, in acid or salified form, and a catalyst, wherein the ionomer concentration is (% by w.) between 0.5% and 40%, the catalyst/ionomer ratio (by w.) being between 0.5 and 4; in said second dispersion the ionomer and/or the catalyst being equal to or different from those used in 1a) and in 2a);
        3b) deposition of the liquid dispersion 3a) on the surface of the ionomeric membrane free from catalyst prepared in 2) to form the second electrocatalytic layer;
        3c) solvent removal from the second dispersion for at least 80% by weight, as in 1c), until obtaining the second electrocatalytic layer, having: a catalyst amount as in 1c); the ionomer percentage extractable after this step from the raw CCM being 80% by weight with respect to the total weight of the ionomer present in the CCM;
    4) annealing of the raw CCM supported on the inert support at temperatures from 120° C. to 280° C. and obtainment of the CCM by separation of the inert support from the CCM.

2. A process according to claim 1, wherein, in steps 1c) and 2c) the residual amount of solvent is up to 5% by weight with respect to the starting solvent weight.

3. A process according to claim 1, wherein the amount of solvent after step 3c) is as in steps 1c) and 2c) or in step 3c) the solvent is completely removed.

4. A process according to claim 1, wherein, by using as ionomers copolymers containing units deriving from the sulphonic monomer $CF_2=CF-O-(CF_2)_2SO_2F$, the annealing of step 4) ranges from 130° C. to 280° C.

5. A process according to claim 4, wherein the annealing of step 4) ranges from 140° C. to 180° C.

6. A process according to claim 1, wherein the inert shows the following properties:
    a size variation in each of the two directions of the plane xy, measured at the temperature of step 4) for 15 minutes, not higher than 2%;

it maintains substantially unchanged the mechanical properties at the temperatures of step 4);

it allows an easy detachment of the CCM.

7. A process according to claim 1, wherein in steps 1a), 2a) and 3a) the solvent is selected from $C_1$-$C_3$, alcohol, n-propanol and/or iso-propanol, or mixtures, of $C_1$-$C_3$ alcohols.

8. A process according to claim 7, wherein optionally other organic solvents can be used provided that they are miscible with water and/or with $C_1$-$C_3$ alcohols.

9. A process according to claim 1, wherein the dispersion, besides the ionomer and the catalyst, contains other components as (per)fluoropolymer fillers, inorganic fillers, surfactants.

10. A process according to claim 1, wherein, in step 1b), the first electrocatalytic layer is deposited on a support containing an impression corresponding to the form of the electrocatalytic layer, removing the excess of the dispersion 1a); the height of the first electrocatalytic layer, after solvent evaporation, being equal to the height of the impression.

11. A process according to claim 1, wherein the formation of the first electrocatalytic layer, is obtained through the following steps: on the inert support is placed a thin and flat sheet, wherein a window having the perimeter of a regular flat figure is cut out corresponding to the form of the electrocatalytic layer; deposit of the dispersion prepared in 1a) in the window of the thin sheet, removing the excess of the dispersion by a blade running in contact with the surface of the sheet; solvent removal; removal of the flat sheet.

12. A process according to claim 1, wherein, in order to form the second electrocatalytic layer in step 3, a sheet placed on the uncoated surface of the membrane is used, wherein the window cut out from said sheet has such shape and size and is positioned on the membrane so that the orthogonal projection of its perimeter on the first electrocatalytic layer is distant from the perimeter of the latter at least one millimeter in each point of the projection.

13. A process according to claim 1, wherein in steps 1c), 2c), the solvent removal is carried out by thermal treatment at 45°-95° C.

14. A process according to claim 1, wherein after step 3c) one passes to step 4) by using a thermal gradient of about 10° C. in the time of 3-30 minutes.

15. A process according to claim 1, wherein in step 3b) the liquid dispersion 3a) is deposited on the surface of the ionomeric membrane to form a second electrocatalytic layer positioned on the membrane so that the orthogonal projection of its perimeter on the first electrocatalytic layer is distant from the perimeter of the latter at least one millimeter in each point of the projection.

\* \* \* \* \*